(12) United States Patent
Han et al.

(10) Patent No.: US 9,409,517 B2
(45) Date of Patent: Aug. 9, 2016

(54) BIOLOGICALLY CONTROLLED VEHICLE AND METHOD OF CONTROLLING THE SAME

(71) Applicants: Hyundai Motor Company, Seoul (KR); Kia Motors Corporation, Seoul (KR)

(72) Inventors: Jae Sun Han, Seoul (KR); Ju Hyun Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/563,699

(22) Filed: Dec. 8, 2014

(65) Prior Publication Data

US 2015/0158425 A1 Jun. 11, 2015

(30) Foreign Application Priority Data

Dec. 11, 2013 (KR) ........................ 10-2013-0153584

(51) Int. Cl.
*B60W 30/00* (2006.01)
*B60Q 9/00* (2006.01)
*G06K 9/00* (2006.01)
*G08G 1/16* (2006.01)

(52) U.S. Cl.
CPC ........ *B60Q 9/00* (2013.01); *B60Q 9/008* (2013.01); *G06K 9/00543* (2013.01); *G06K 9/00798* (2013.01); *G06K 9/00845* (2013.01); *G08G 1/167* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,612,882 | A | * | 3/1997 | LeFebvre | G01C 21/3453 340/990 |
| 6,223,117 | B1 | * | 4/2001 | Labuhn | B60K 31/0008 180/169 |
| 6,438,472 | B1 | * | 8/2002 | Tano | G01C 21/26 701/25 |
| 6,449,572 | B1 | * | 9/2002 | Kurz | G60R 16/0231 702/92 |
| 6,675,081 | B2 | * | 1/2004 | Shuman | G08G 1/096888 340/436 |
| 6,711,493 | B1 | * | 3/2004 | Andrews | G08G 1/0104 340/903 |

(Continued)

FOREIGN PATENT DOCUMENTS

| | | |
|---|---|---|
| JP | H06171392 A | 6/1994 |
| JP | 2007-265377 A | 10/2007 |

(Continued)

OTHER PUBLICATIONS

Notice of Patent Allowance from Korea Intellectual Property Office for Korean Application No. 10-2013-0153584, with English translation, 8 pages.

*Primary Examiner* — Jonathan L Sample
(74) *Attorney, Agent, or Firm* — Mintz Levin Cohn Ferris Glovsky and Popeo, P.C.; Peter F. Corless

(57) ABSTRACT

A vehicle that performs a lane departure warning or lane keeping assistance by reflecting a driver's stress index to more effectively guarantee safe driving, and a method of controlling the same are provided. The vehicle includes a biological signal detecting unit configured to detect a biological signal of a driver and a lane detecting unit configured to detect a lane within which a vehicle is running. A controller is configured to calculate a stress index of the driver based on the detected biological signal of the driver, determine a lane access degree of the vehicle based on the detected lane, and execute a warning output to the driver based on the calculated stress index and the determined lane access degree of the vehicle.

17 Claims, 19 Drawing Sheets

(56) References Cited

U.S. PATENT DOCUMENTS

| | | | | |
|---|---|---|---|---|
| 6,873,911 B2* | 3/2005 | Nishira | ............... | B60T 7/16 340/436 |
| 7,382,274 B1* | 6/2008 | Kermani | ............ | B60K 31/0058 340/435 |
| 7,444,311 B2* | 10/2008 | Engstrom | ........ | B60W 30/18181 706/20 |
| 7,765,058 B2* | 7/2010 | Doering | ............. | B60R 16/0236 340/425.5 |
| 7,809,487 B2* | 10/2010 | Syed | ............... | B60T 8/174 701/70 |
| 8,022,831 B1* | 9/2011 | Wood-Eyre | ............... | B60T 7/14 180/272 |
| 9,101,313 B2* | 8/2015 | Levin | ............... | A61B 5/18 |
| 2002/0091473 A1* | 7/2002 | Gardner | ............... | G07C 5/0808 701/32.7 |
| 2003/0065432 A1* | 4/2003 | Shuman | ............... | B60K 28/06 701/48 |
| 2003/0097047 A1* | 5/2003 | Woltermann | ............ | A61B 5/165 600/300 |
| 2004/0209594 A1* | 10/2004 | Naboulsi | ............... | G08B 21/06 455/404.1 |
| 2004/0243301 A1* | 12/2004 | Kim | ............... | G01C 21/3492 701/533 |
| 2004/0252027 A1* | 12/2004 | Torkkola | ............... | G08B 21/06 340/576 |
| 2005/0131597 A1* | 6/2005 | Raz | ............... | G09B 19/167 701/29.1 |
| 2005/0159851 A1* | 7/2005 | Engstrom | ............... | B60W 30/18181 701/1 |
| 2005/0228578 A1* | 10/2005 | Burzio | ............... | G08G 1/0104 701/117 |
| 2005/0256635 A1* | 11/2005 | Gardner | ............... | G01C 21/26 701/431 |
| 2006/0195231 A1* | 8/2006 | Diebold | ............... | B60R 21/013 701/1 |
| 2006/0235753 A1* | 10/2006 | Kameyama | ......... | B60H 1/00742 705/15 |
| 2007/0112500 A1* | 5/2007 | Ogawa | ............... | B60K 6/48 701/96 |
| 2007/0124027 A1* | 5/2007 | Betzitza | ............... | B60W 40/02 701/1 |
| 2007/0268158 A1* | 11/2007 | Gunderson | ............ | G06Q 40/08 340/933 |
| 2008/0046150 A1* | 2/2008 | Breed | ............... | B60R 21/0134 701/45 |
| 2008/0119994 A1* | 5/2008 | Kameyama | ........... | B60W 40/08 701/48 |
| 2008/0231703 A1* | 9/2008 | Nagata | ............... | H04N 7/181 348/148 |
| 2008/0252466 A1* | 10/2008 | Yopp | ............... | B60K 28/066 340/576 |
| 2008/0275618 A1* | 11/2008 | Grimm | ............... | G08G 1/162 701/96 |
| 2009/0271101 A1* | 10/2009 | Relyea | ............... | G08G 1/0104 701/118 |
| 2010/0033333 A1* | 2/2010 | Victor | ............... | A61B 3/113 340/576 |
| 2010/0052884 A1* | 3/2010 | Zeppelin | ............... | B60W 30/16 340/435 |
| 2010/0094502 A1* | 4/2010 | Ito | ............... | G08G 1/096725 701/36 |
| 2010/0295707 A1* | 11/2010 | Bennie | ............... | B60W 40/09 340/988 |
| 2011/0245643 A1* | 10/2011 | Lisseman | ............... | A61B 5/01 600/372 |
| 2011/0284304 A1* | 11/2011 | Van Schoiack | ......... | B62D 1/046 180/272 |
| 2012/0078445 A1* | 3/2012 | Krupansky | ............ | G01C 23/00 701/3 |
| 2013/0018549 A1* | 1/2013 | Kobana | ............... | B60K 28/06 701/41 |
| 2013/0073115 A1* | 3/2013 | Levin | ............... | A61B 5/18 701/1 |
| 2013/0231830 A1* | 9/2013 | Van Dan Elzen | ..... | B60W 50/14 701/42 |
| 2013/0325202 A1* | 12/2013 | Howard | ............... | B60W 30/08 701/1 |
| 2014/0022070 A1* | 1/2014 | Golomb | ............... | B60Q 1/0082 340/475 |
| 2016/0001781 A1* | 1/2016 | Fung | ............... | G06F 19/345 701/36 |

FOREIGN PATENT DOCUMENTS

| | | |
|---|---|---|
| JP | 2009-208505 A | 9/2009 |
| JP | 2009-301367 A | 12/2009 |
| JP | 2011-039735 A | 2/2011 |
| KR | 20-1998-0044690 | 9/1998 |
| KR | 10-2009-0007982 A | 1/2009 |
| KR | 2011-0135715 A | 12/2011 |
| KR | 2012-0089498 A | 8/2012 |

* cited by examiner

FIG. 8

| VARIABLE | MEAN(mi) | STANDARD DEVIATION(sdi) |
|---|---|---|
| HR | 73 | 9 |
| SDNN | 37 | 12 |
| LF/HF | 1.1 | 0.25 |
| HRV-Index | 12.5 | 5 |

FIG. 9

| STAGE | STRESS INDEX(SI) | MEANING |
|---|---|---|
| 1 | 25 OR LESS | VERY GOOD |
| 2 | 35~45 | STANDARD OR BETTER |
| 3 | 45~55 | STANDARD |
| 4 | 55~65 | STANDARD OR WORSE |
| 5 | 65 OR MORE | VERY BAD |

FIG. 15

| STRESS STAGE | LANE ACCESS DISTANCE | WARNING OUTPUT |
|---|---|---|
| 1-3 | LANE DISTANCE 10% | WARNING SOUND |
| | LANE DISTANCE 0% | WARNING SOUND + HANDLE VIBRATION |
| 4 | LANE DISTANCE (10+a)% | WARNING SOUND |
| | LANE DISTANCE (0+b)% | WARNING SOUND + HANDLE VIBRATION |
| 5 | LANE DISTANCE (10+A)% | WARNING SOUND |
| | LANE DISTANCE (0+B)% | WARNING SOUND + HANDLE VIBRATION |

BIOLOGICALLY CONTROLLED VEHICLE AND METHOD OF CONTROLLING THE SAME

CROSS-REFERENCE TO RELATED APPLICATION

This application claims the benefit of Korean Patent Application No. 10-2013-0153584, filed on Dec. 11, 2013 in the Korean Intellectual Property Office, the disclosure of which is incorporated herein by reference.

BACKGROUND

1. Field

The present invention relates to a vehicle controlled by biological signals of a driver and a method of controlling the same.

2. Description of the Related Art

Recently, various systems for assisting with safe driving of vehicles are under development. Examples of an assisting system for preventing lane departure of the vehicle include a lane keeping assist system (LKAS) and a lane departure warning system (LDWS). Meanwhile, a driver's ability to control a vehicle may be affected by the driver's stress index. When the driver's stress index is substantially high, the ability to control the vehicle may decrease. Therefore, the development of technology that reflects the driver's stress index is necessary for assisting with driving of a vehicle.

SUMMARY

The present invention provides a vehicle that performs a lane departure warning or lane keeping assistance by reflecting a driver's stress index to more effectively guarantee safe driving, and a method of controlling the same.

According to an aspect of the present invention, a biologically controlled vehicle is provided. The vehicle may include a biological signal detecting unit configured to detect a biological signal of a driver, a lane detecting unit configured to detect a lane within which a vehicle is running, and a controller configured to calculate a stress index of the driver based on the detected biological signal of the driver, determine a lane access degree of the vehicle based on the detected lane, and execute a warning output to the driver based on the calculated stress index and the determined lane access degree of the vehicle.

The lane access degree of the vehicle may include information regarding a distance between the vehicle and the lane. The controller may be configured to compare the distance between the vehicle and the lane with at least one reference value that corresponds to the calculated stress index, and execute a warning output to the driver when the distance between the vehicle and the lane is equal to or less than the at least one reference value. The at least one reference value may increase as the stress index corresponding thereto increases.

The vehicle may further include a sound output unit configured to output a sound, and a steering wheel manipulated by the driver to adjust steering of the vehicle. The at least one reference value may include a first reference value and a second reference value that is greater than the first reference value, and the controller may be configured to operate the sound output unit to output a warning sound when the distance between the vehicle and the lane is equal to or less than the second reference value and is greater than the first reference value. The controller may further be configured to operate the sound output unit to output a warning sound and vibrate the steering wheel when the distance between the vehicle and the lane is equal to or less than the first reference value. The biological signal detecting unit may include an electrocardiogram (ECG) sensor, and the ECG sensor may be installed within a steering wheel of the vehicle. The lane detecting unit may include at least one of an image sensor and an infrared sensor.

The controller may be configured to adjust steering of the vehicle based on the calculated stress index and the determined lane access degree of the vehicle. Additionally, the controller may be configured to compare the distance between the vehicle and the lane with at least one reference value that corresponds to the calculated stress index, and output a warning to the driver or adjust steering of the vehicle when the distance between the vehicle and the lane is equal to or less than the at least one reference value.

The at least one reference value may include a first reference value and a second reference value that is greater than the first reference value, and the controller may be configured to adjust steering of the vehicle when the distance between the vehicle and the lane is equal to or less than the first reference value, and output a warning to the driver when the distance between the vehicle and the lane is equal to or greater than the first reference value and equal to or less than the second reference value.

The vehicle may further include a motor driven power steering (MDPS) motor configured to supply power to a steering wheel of the vehicle. The controller may be configured to transmit a control signal to the MDPS motor and adjust steering of the vehicle.

According to another aspect of the present invention, a method of controlling a biologically controlled vehicle is provided. The method may include detecting a biological signal of a driver, detecting a lane within which a vehicle is running, calculating a stress index of the driver based on the detected biological signal of the driver, determining a lane access degree of the vehicle based on the detected lane, and executing a warning output to the driver based on the calculated stress index and the determined lane access degree of the vehicle.

The biological signal of the driver may include an electrocardiogram (ECG) signal, and the calculating of the stress index of the driver may include obtaining heart rate variability based on the ECG signal of the driver, and calculating the stress index of the driver based on the obtained heart rate variability. The lane access degree of the vehicle may include information regarding a distance between the vehicle and the lane. The execution of the warning output to the driver may include comparing a distance between the vehicle and the lane with at least one reference value that corresponds to the calculated stress index, and outputting a warning to the driver when the distance between the vehicle and the lane is equal to or less than the at least one reference value. The at least one reference value may increase as the stress index corresponding thereto increases.

The method may further include adjusting steering of the vehicle based on the calculated stress index and the determined lane access degree of the vehicle. The execution of the warning output to the driver may include comparing the distance between the vehicle and the lane with a second reference value that corresponds to the calculated stress index, and outputting a warning to the driver when the distance between the vehicle and the lane is equal to or less than the second reference value. The adjustment of the steering of the vehicle may include comparing a distance between the vehicle and the lane with a first reference value that corresponds to the calculated stress index and is less than the second reference value, and adjusting steering of the vehicle when the distance between the vehicle and the lane is equal to or less than the first reference value.

BRIEF DESCRIPTION OF THE DRAWINGS

These and/or other aspects of the invention will become apparent and more readily appreciated from the following description of the exemplary embodiments, taken in conjunction with the accompanying drawings of which:

FIG. 8 is an exemplary table showing an exemplary mean and standard deviation of each analysis indicator obtained through an experiment according to an exemplary embodiment of the present invention;

FIG. 9 is an exemplary table in which a stress index is divided into stages based on its value and a human body state indicated by each stage is represented according to an exemplary embodiment of the present invention;

FIG. 15 is an exemplary diagram illustrating exemplary warning output control logic according to stress stages and a lane access distance according to an exemplary embodiment of the present invention;

DETAILED DESCRIPTION

Figure 1:
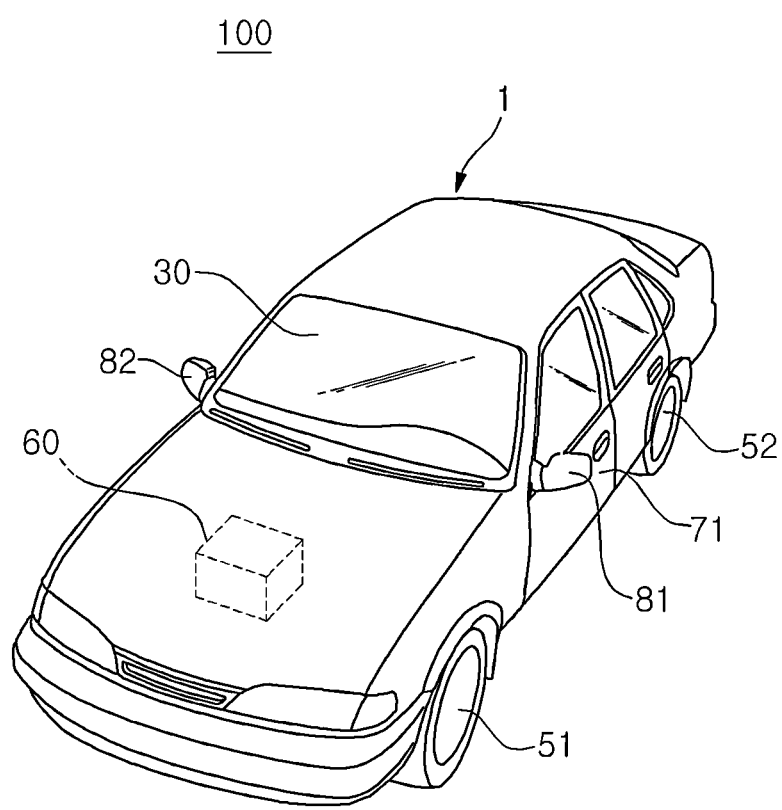
FIG. 1 is an exemplary diagram illustrating an exterior appearance of a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a vehicle and a method of controlling the same according to embodiments of the present invention will be described in detail with reference to the accompanying drawings.

FIG. 1 is an exemplary diagram illustrating an exterior appearance of a vehicle according to an exemplary embodiment of the present invention. As illustrated in FIG. 1, a vehicle 100 may include a main body 1 forming an appearance of the vehicle 100, a plurality of wheels 51 and 52 configured to move the vehicle 100, a driving unit 60 configured to rotate the wheels 51 and 52, a plurality of doors 71 and 72 (refer to FIG. 3) configured to shield an inside of the vehicle 100 from the exterior, a front glass 30 configured to provide a field of view in front of the vehicle 100 to a driver within the vehicle 100, and a plurality of side mirrors 81 and 82 configured to provide a field of view behind the vehicle 100 to the driver.

The wheels 51 and 52 may include front wheels 51 disposed at a front of the vehicle and rear wheels 52 disposed at a rear of the vehicle. The driving unit 60 may be configured to provide rotary power to the front wheels 51 or the rear wheels 52 to move the main body 1 forward or backward. The driving unit 60 may include an engine configured to combust fossil fuels and generate rotary power or a motor configured to receive power from or a condenser (not illustrated) and generate rotary power. The doors 71 and 72 may be pivotally disposed on left and right sides of the main body 1. When the doors are opened, the driver may enter the vehicle 100, and when the doors are closed, the doors may be configured to shield the inside of the vehicle 100 from the exterior.

The front glass 30 may be disposed in the upper front of the main body 1 and may enable the driver in the vehicle 100 to obtain visual information from in front of the vehicle 100, and is also called a windshield glass. In addition, the side mirrors 81 and 82 may include a left side mirror 81 disposed on the left side of the main body 1 and a right side mirror 82 disposed on the right side thereof. The mirrors 81 and 82 allow the driver in the vehicle 100 to obtain visual information from beside and behind the vehicle 100.

The vehicle 100 may further include a detecting device such as a proximity sensor configured to detect obstacles at the side or rear of the vehicle or may be configured to detect another vehicle, and a rain sensor configured to detect rainfall and precipitation. The proximity sensor may be configured to transmit a detection signal to a side or a rear of the vehicle and receive a reflection signal reflected from an obstacle such as another vehicle. The obstacle in a side or a rear of the vehicle 100 may be detected and a location of the obstacle may be detected based on a waveform of the received reflection signal. As an example of such a proximity sensor, a method in which an ultrasound is transmitted and a distance to the obstacle may be detected using an ultrasound reflected from the obstacle may be used.

Figure 2:
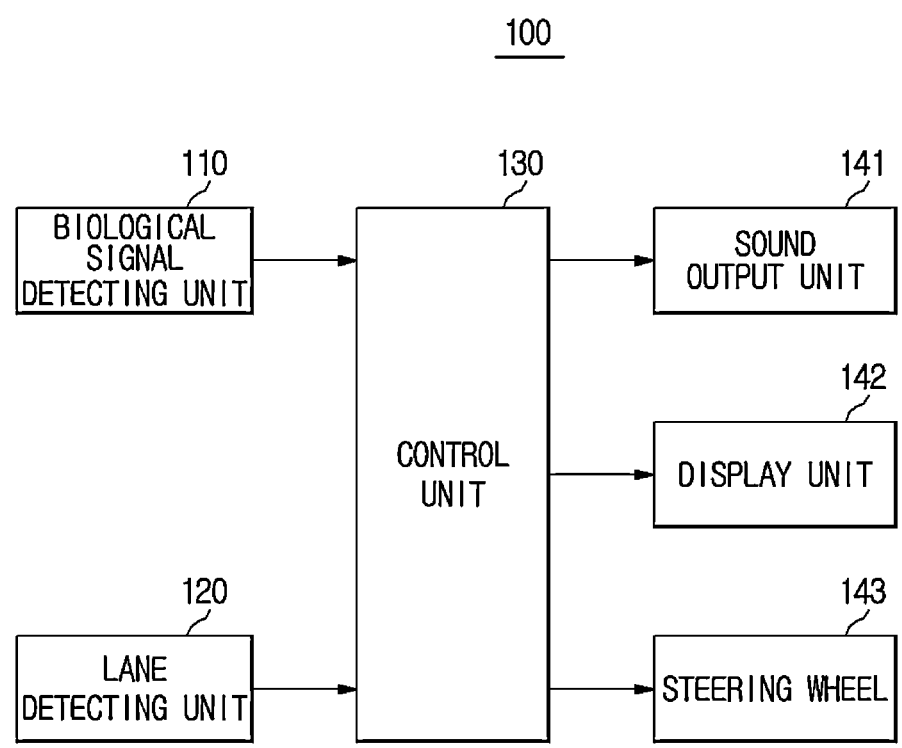
FIG. 2 is an exemplary control block diagram of the vehicle according to the exemplary embodiment of the present invention.
Figure 3:
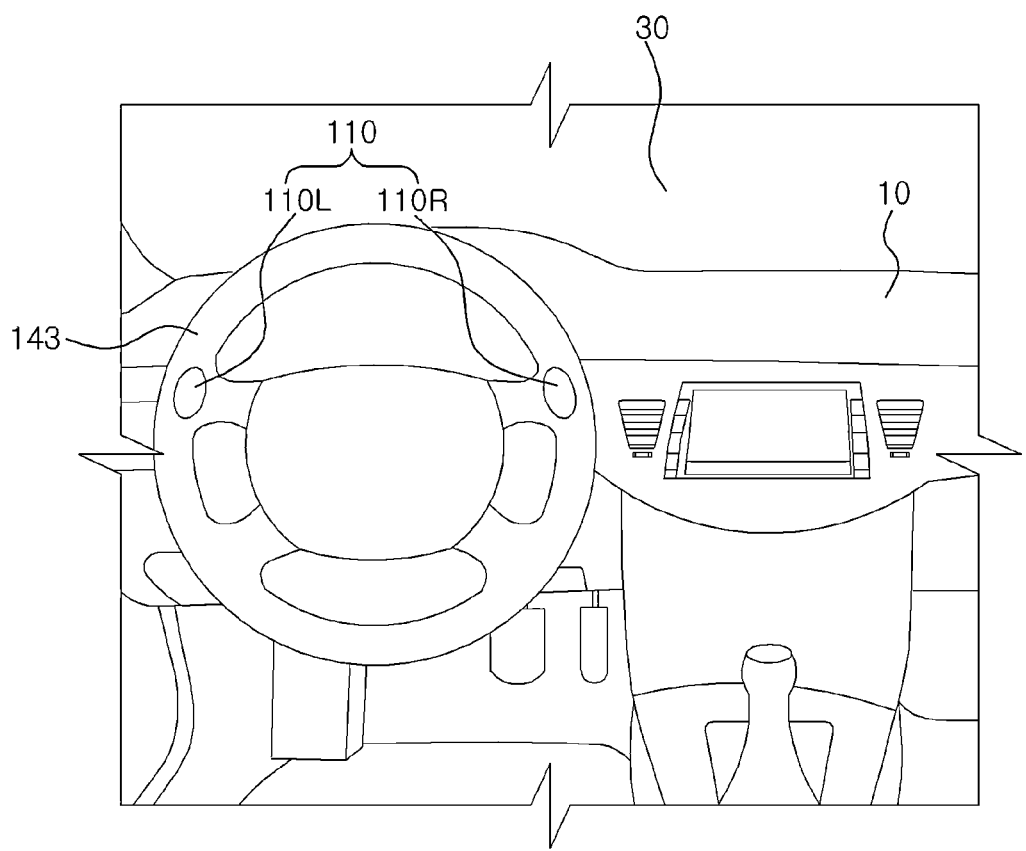
FIG. 3 is an exemplary diagram illustrating an exemplary biological signal detecting unit according to an exemplary embodiment of the present invention.

FIG. 2 is an exemplary control block diagram of the vehicle according to the exemplary embodiment of the present invention. FIG. 3 is an exemplary diagram illustrating an exemplary biological signal detecting unit. As illustrated in FIG. 2, the vehicle 100 may include a biological signal detecting unit 110 configured to detect a biological signal of a driver, a lane detecting unit 120 configured to detect a lane within which a vehicle is running, a controller 130 configured to execute a warning output to the driver based on the driver's biological signal and a lane access degree of the vehicle, a sound output unit 141 configured to audibly output a warning to the driver, a display unit 142 configured to visually output a warning to the driver, and a steering wheel 143 configured to tactilely output a warning to the driver. The controller 130 may be configured to execute the biological signal detecting unit 110, the lane detecting unit 120, the sound output unit 141, the display unit 142, and the steering wheel 143 output.

The biological signal detected by the biological signal detecting unit 110 may be used by the controller 130 to calculate a stress index of the driver. Biological indicators used to calculate the stress index of the driver may include a heart rate (HR) or heart rate variability (HRV). The biological signal necessary for obtaining the heart rate or the heart rate variability may include an electrocardiogram (ECG) signal. Therefore, the biological signal detecting unit 110 may be implemented by an ECG sensor configured to detect the driver's ECG signal. To detect the driver's ECG signal, the biological signal detecting unit 110 comes in contact with a part of the driver's body (e.g., touches the driver's body or moves toward to driver's body). For example, the biological signal detecting unit 110 may be installed in the steering wheel 143 as illustrated in FIG. 3.

The biological signal detecting unit 110 configured to detect the driver's ECG signal may include a left electrode 110L and a right electrode 110R as illustrated in FIG. 3. The left electrode 110L and the right electrode 110R may be installed in left and right sides of the steering wheel 143, respectively. When the driver grasps the steering wheel 143 to drive the vehicle, a left hand of the driver may come in contact with the left electrode 110L and a right hand may come in contact with the right electrode 110R. When the driver's left hand and right hand come in contact with (e.g., touch, apply pressure to, etc.) the left electrode 110L and the right electrode 110R, respectively, a current flowing through the driver's body may be input to the biological signal detecting unit 110 through the driver's hands and the ECG signal may be obtained.

Referring again to FIG. 2, to detect a lane within which the vehicle 100 is running, the lane detecting unit 120 may be implemented by at least one of an image sensor and an infrared sensor. When the lane detecting unit 120 is implemented by the image sensor, it may be installed at a position in which a front image of the vehicle 100 may be captured. When the lane detecting unit 120 is implemented by the infrared sensor, it may be installed at a bottom of the vehicle 100 such that infrared rays may be radiated onto the ground including the lane and infrared rays reflected from the ground may be received.

When the lane detecting unit 120 is implemented by the image sensor, the lane detecting unit 120 may be configured to capture a front image of the vehicle and transmit the image to the controller 130. The controller 130 may then be configured to recognize the lane in the front image of the vehicle using an image processing method such as edge detection and calculate the lane access degree of the vehicle 100. Alternatively, when the lane detecting unit 120 is implemented by the infrared sensor, an output signal of the lane detecting unit 120 may be transmitted to the controller 130. The controller 130 may then be configured to recognize the lane from the output signal of the lane detecting unit 120 based on a difference of an infrared reflection amount between a white or yellow (orange) lane and the ground. However, the image sensor and the infrared sensor are merely examples for implementing the lane detecting unit 120. Types of the lane detecting unit 120 applied to the exemplary embodiment of the present invention are not limited.

The lane access degree may include information regarding a distance between the lane and the vehicle 100. Specifically, the lane access degree may be determined by a ratio of a width of the lane and the distance between the lane and the vehicle 100. In addition, the controller 130 may be configured to calculate the driver's stress index based on the driver's biological signal output from the biological signal detecting unit 110 and execute a warning output to the driver based on the driver's stress index, and an access degree of the vehicle 100 to the lane. Details thereof will be described below. The controller 130 may include a processor such as a micro control unit (MCU) and an electronic control unit (ECU). Two or more MCUs or ECUs may also be included as necessary.

Figure 4:
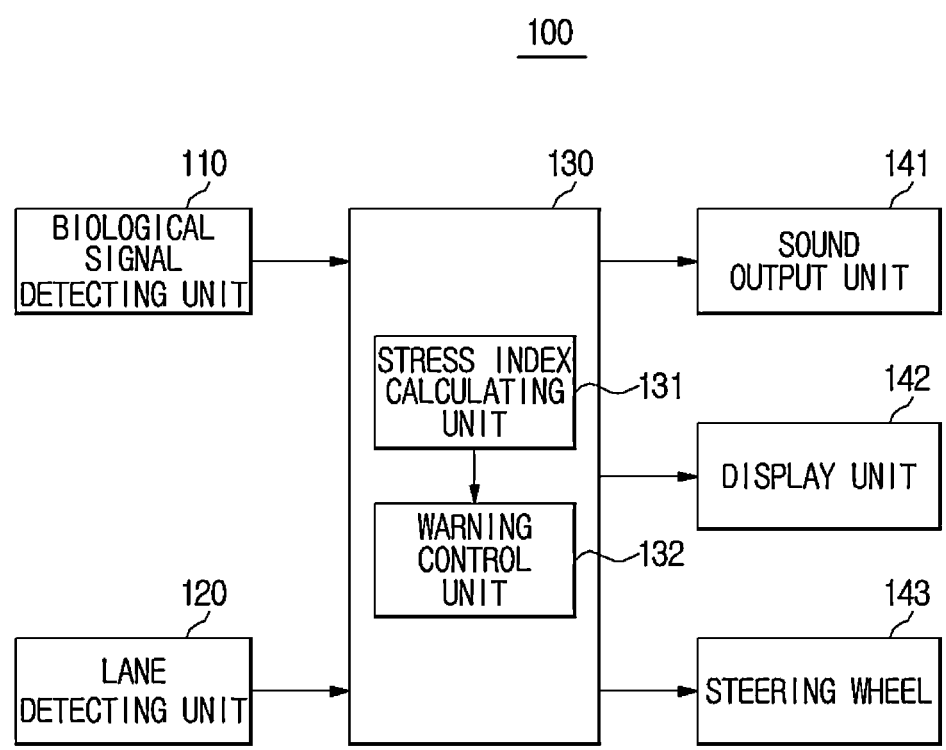
FIG. 4 is an exemplary control block diagram illustrating a configuration of the vehicle according to the exemplary embodiment of the present invention.

FIG. 4 is an exemplary control block diagram illustrating a configuration of the vehicle according to the exemplary embodiment of the present invention. As illustrated in FIG. 4, the controller 130 may include a stress index calculating unit 131 configured to calculate a stress index based on the driver's biological signal and a warning controller 132 configured to execute a warning output to the driver based on the lane access degree of the vehicle and the stress index. Hereinafter, operations of the stress index calculating unit 131 will be described in detail with reference to FIGS. 5 to 9.

Figure 5:
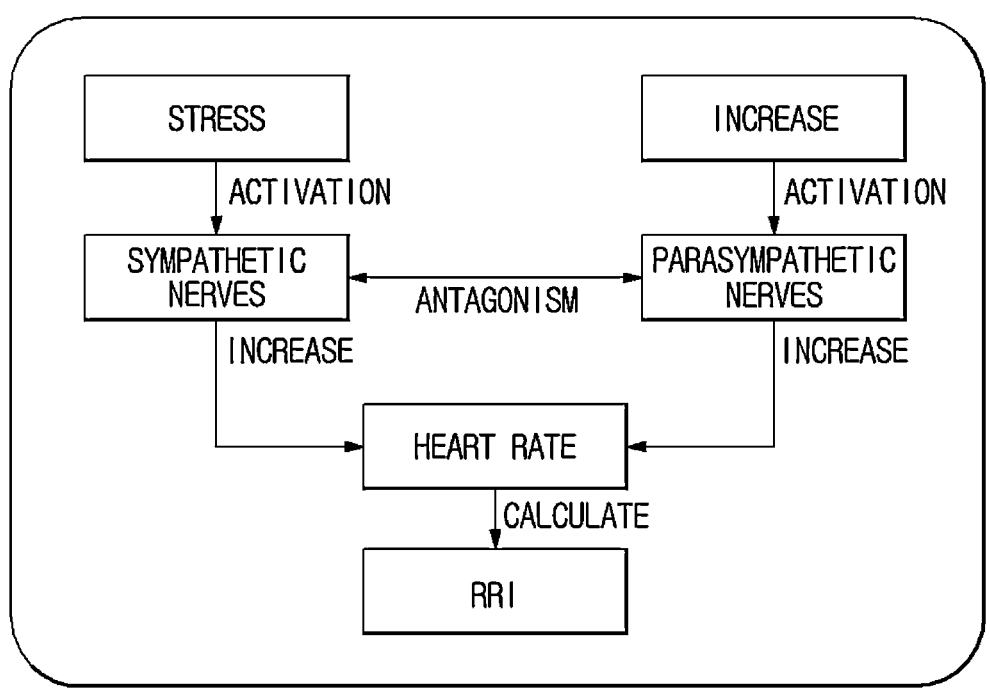
FIG. 5 is an exemplary diagram illustrating a relation between stress and heart rate variability according to an exemplary embodiment of the present invention.

FIG. 5 is an exemplary diagram illustrating a relation between stress and heart rate variability. When stressors affect a human body, a biological change for coping with the stressors occurs to maintain a biological balance. Representative methods of measuring stress may include measuring stress hormones in blood, measuring heart rate variability, and the like. As illustrated in FIG. 5, when the human body is affected by stress, sympathetic nerves are activated, and when the human body is in a stable state, parasympathetic nerves are activated. The sympathetic nerves and the parasympathetic nerves function in opposition to each other to maintain the biological balance, that is, regulate physiological functions in an antagonistic manner.

As a representative function thereof, when the sympathetic nerves are activated, the heart rate increases, and when the parasympathetic nerves are activated, the heart rate decreases. Therefore, when the heart rate is analyzed, it may be possible to determine how much the human body is affected by stress. As illustrated in FIG. 5, analysis of the heart rate refers to calculating an R-wave to R-wave interval (RRI). Hereinafter, the meaning of the RRI will be described. As described above, the biological signal detecting unit 110 may be configured to detect the driver's ECG signal. The stress index calculating unit 131 may be configured to calculate the stress index by obtaining information regarding the heart rate variability from the detected ECG signal of the driver.

Figure 6:
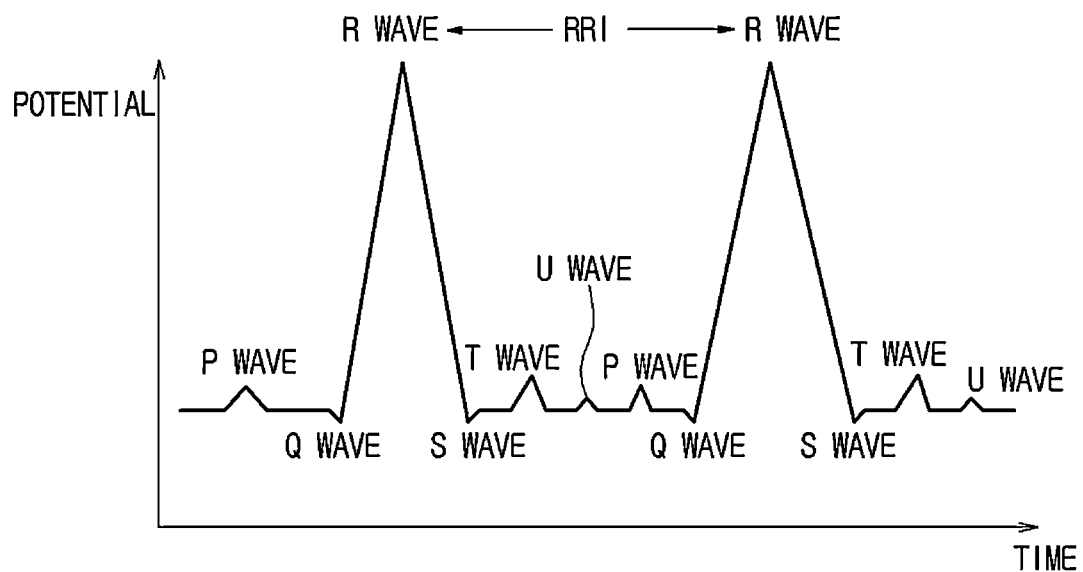
FIG. 6 is an exemplary graph illustrating an R-wave to R-wave interval (RRI) of an electrocardiogram (ECG) signal according to an exemplary embodiment of the present invention.

FIG. 6 is an exemplary graph illustrating the RRI of the ECG signal. As illustrated in FIG. 6, the ECG signal may include a P wave, a Q wave, an S wave, a T wave, and an R wave. The P wave may be caused by a current generated when depolarization is performed before the atria contract. The QRS complex wave may be caused by a current generated when the ventricles are depolarized. The T wave may be caused by a current generated when the ventricles are repolarized. As illustrated in FIG. 6, as an indicator representing the heart rate variability, the RRI of the ECG signal may be used. The RRI may be converted into a heart rate per minute and may be successively represented, which is called the heart rate variability. When the heart rate increases, the RRI decreases, which serves as an indicator that represents a degree of tension or stress. In other words, when the RRI is substantially small (e.g., below a predetermined value), a human body under stress may be determined.

Figure 7:
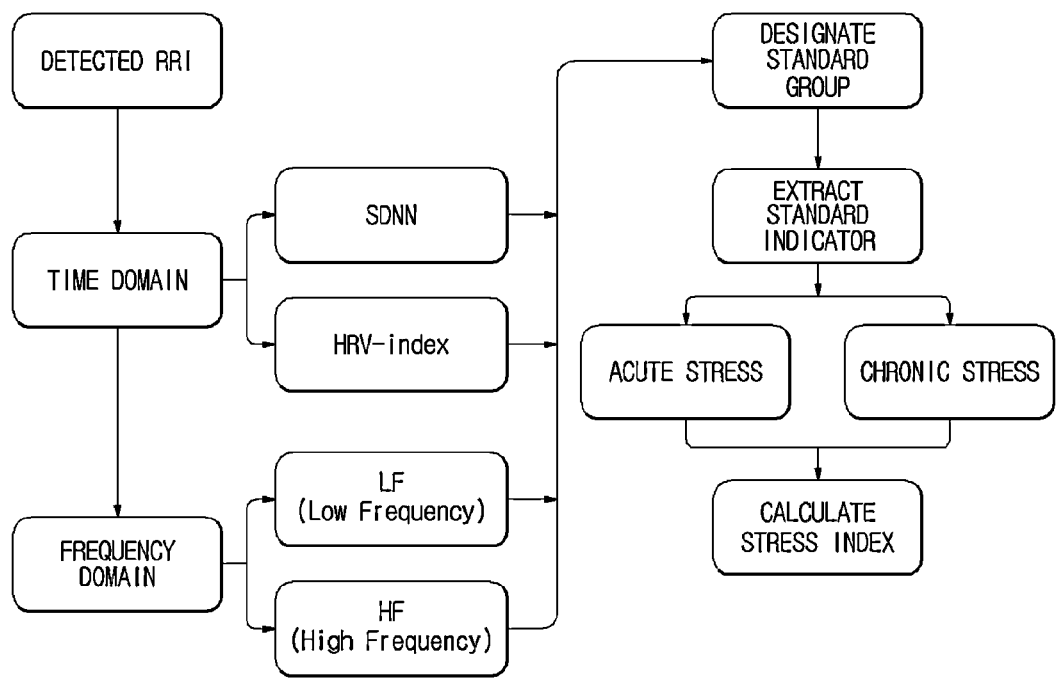
FIG. 7 is an exemplary diagram schematically illustrating a process of a stress index calculating unit that calculates a stress index according to an exemplary embodiment of the present invention.

FIG. 7 is an exemplary diagram schematically illustrating a process of a stress index calculating unit calculating a stress index. FIG. 8 is an exemplary table showing an exemplary mean and standard deviation of each analysis indicator obtained through an experiment. As illustrated in FIG. 7, the stress index calculating unit 131 may be configured to detect the RRI based on the ECG signal transmitted from the biological signal detecting unit 110 and analyze the RRI. A method of analyzing the RRI may include a time domain analysis method and a frequency domain analysis method.

The time domain analysis method may be a method in which time series data of chronologically listed RRIs may be analyzed from the beginning to the end. The stress index calculating unit 131 may be configured to calculate a standard deviation of an N-N interval (SDNN) of normal N-N intervals at specific time intervals and a heart rate variability index (HRV-index) according to the time domain analysis method. In particular, the N-N interval refers to an R-R interval of successive normal sinus rhythms. The SDNN may be calculated by the following Equation 1.

$$SDNN = \sqrt{\frac{1}{N-1}\sum_{j=1}^{N}(RR_j - \overline{RR})^2}$$

Equation 1 wherein, RR represents an R-R interval, and $\overline{RR}$ represents a mean of R-R intervals.

The HRV-index may be a variable that quantifies features of a geometric shape of probability distribution. A decrease in a value of the HRV-index means that the sympathetic nerves are activated and electrical instability of the heart is substantially high. A standard range of the HRV-index is about 14 to 33%.

The frequency domain analysis method may be a method in which time series data may be considered as a set of multiple sine waves, a waveform formed of a sum of multiple sine waves may be decomposed as a frequency component of each sine wave and an amplitude of each component is represented as a spectrum. The stress index calculating unit 131 may be configured to extract a low frequency (LF) and a high frequency (HF) according to the frequency domain analysis method and calculate LF/HF. The LF represents a state in which both the sympathetic nerves and the parasympathetic nerves are activated at a heart rate of about 0.05 to 0.15 Hz. The HF represents a state in which the parasympathetic nerves are activated at a heart rate of about 0.15 Hz or greater. As the LF/HF increases, it represents a state in which the sympathetic nerves are significantly activated. Therefore, the LF/HF may be used to calculate the stress index.

As described above, the stress index calculating unit 131 may be configured to analyze the detected RRI according to the time domain analysis method and the frequency domain analysis method, obtain the SDNN, the HRV-index, and the LF/HF, designate a standard group, and calculate a mean ($m_i$) and a standard deviation ($sd_i$) of each analysis indicator ($P_i$) included in the designated standard group as exemplified in FIG. 8. Additionally, the stress index calculating unit 131 may be configured to designate any value of the mean (M) and any value of the standard deviation (SD), apply the values to the following Equation 2, and calculate the standard indicator ($T_i$) of each analysis indicator.

$$Ti = M + SD\frac{Pi - mi}{sdi}$$

Equation 2

Further, each standard indicator ($T_i$) may be applied to the following Equation 3, and the stress index (SI) may be calculated.

$$SI = \frac{\left(2M - \frac{T_{SDNN} + T_{HRV-index}}{2} + \frac{T_{LF/HF} + T_{HR}}{2}\right)}{2}$$

Equation 3 wherein, $\frac{T_{SDNN} + T_{HRV-index}}{2}$ represents chronic stress, and $$\frac{T_{LF/HF} + T_{HR}}{2}$$

represents acute stress. Accordingly, the stress index calculating unit 131 may be configured to reflect the different stresses and calculate a comprehensive stress index.

Moreover, since external factors causing stress of the driver or a psychological state of the driver may change from moment to moment (e.g., at any moment), the stress index calculating unit 131 may be configured to repeatedly calculate the stress index according to a predetermined cycle.

FIG. 9 is an exemplary table in which a stress index is divided into stages based on its value and a human body state indicated by each stage is represented. As illustrated in FIG. 9, when the calculated stress index is about 25 or less (stage 1), it represents a very good state of little or no stress. When the calculated stress index is about 35 to 45 (stage 2), it represents a standard or better state. When the calculated stress index is about 45 to 55 (stage 3), it represents a standard state. When the calculated stress index is about 55 to 65 (stage 4), it represents a standard or worse state. When the calculated stress index is about 65 or greater (stage 5), it represents a pour state with a substantially high amount of stress. In other words, the different stress indexes represents different levels or stages of stress that increase as the index increases. The various stress stages may be predetermined levels of stress that increase as the calculated stress index increases. The stress index calculating unit 131 may be configured to determine a current stress stage of the driver according to the relation between the stress index value and the stress stage shown in FIG. 9.

The method of calculating the stress index described above is merely an example that may be applied to the exemplary embodiment of the present invention. The method of calculating the stress index in the stress index calculating unit 131 is not limited to the above method. The stress index calculating unit 131 may be configured to calculate the driver's stress index by applying various methods in addition to the above method. In addition, the stress stage that corresponds to the value of the stress index shown in FIG. 9 may be changed according to the method of calculating the stress index.

Figure 10:
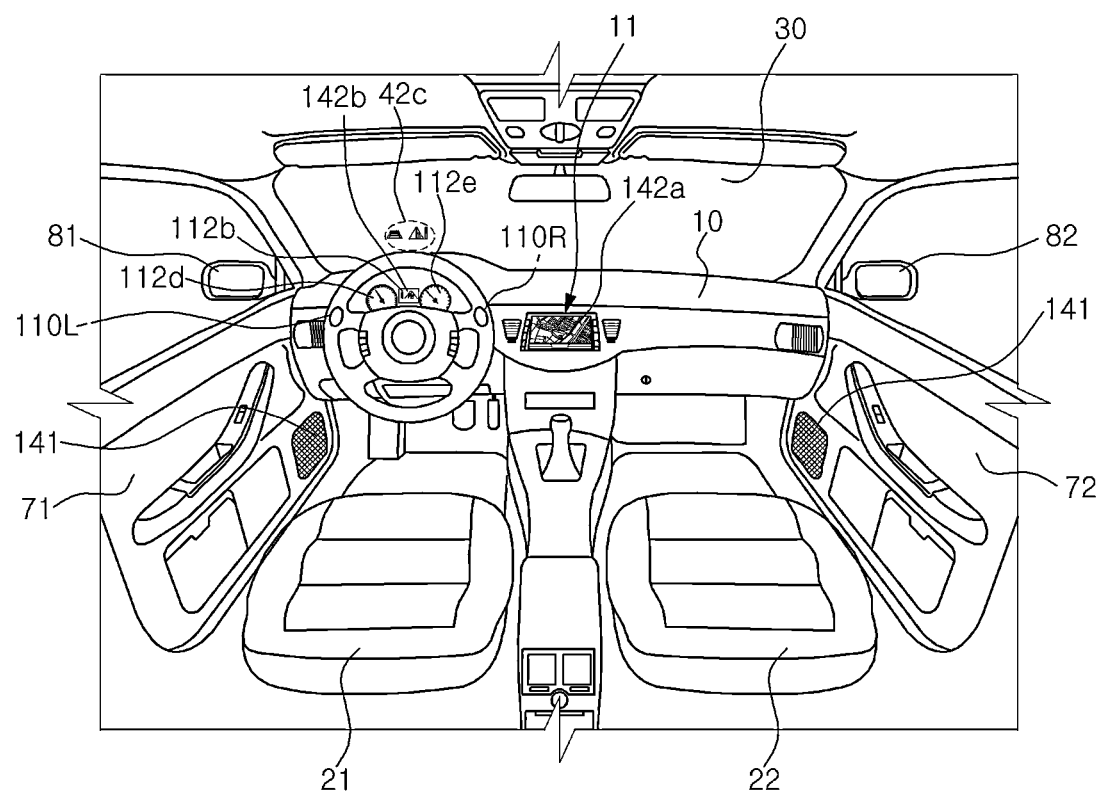
FIG. 10 is an exemplary diagram illustrating an internal configuration of a front seat side of the vehicle according to an exemplary embodiment of the present invention.
Figure 11:
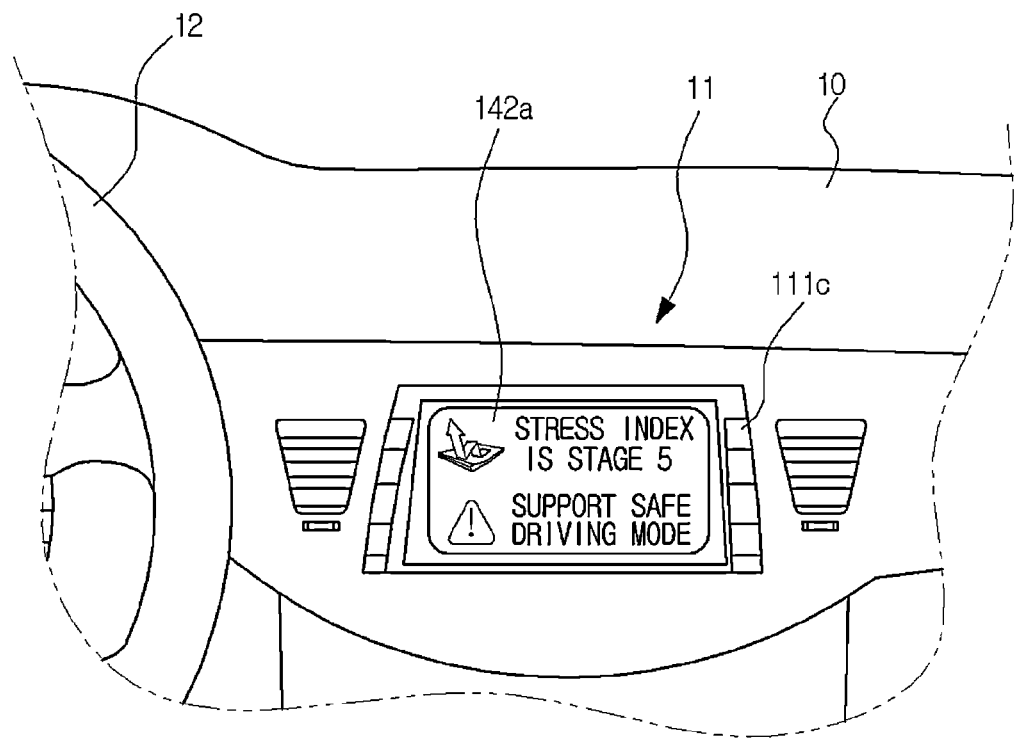
FIGS. 11 to 13 are exemplary diagrams illustrating examples of visually outputting information regarding a stress index of a driver according to an exemplary embodiment of the present invention.
Figure 12:
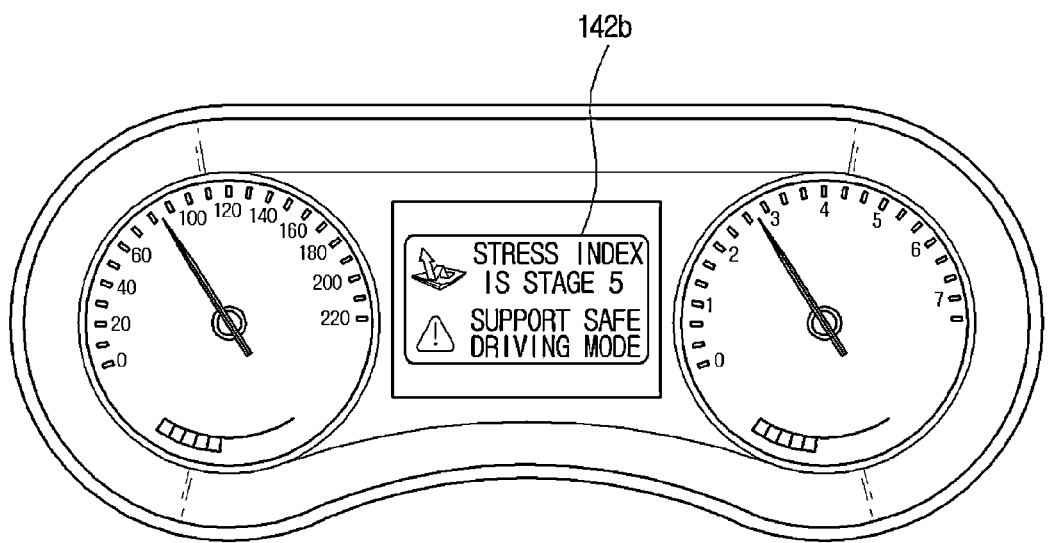
Figure 13:
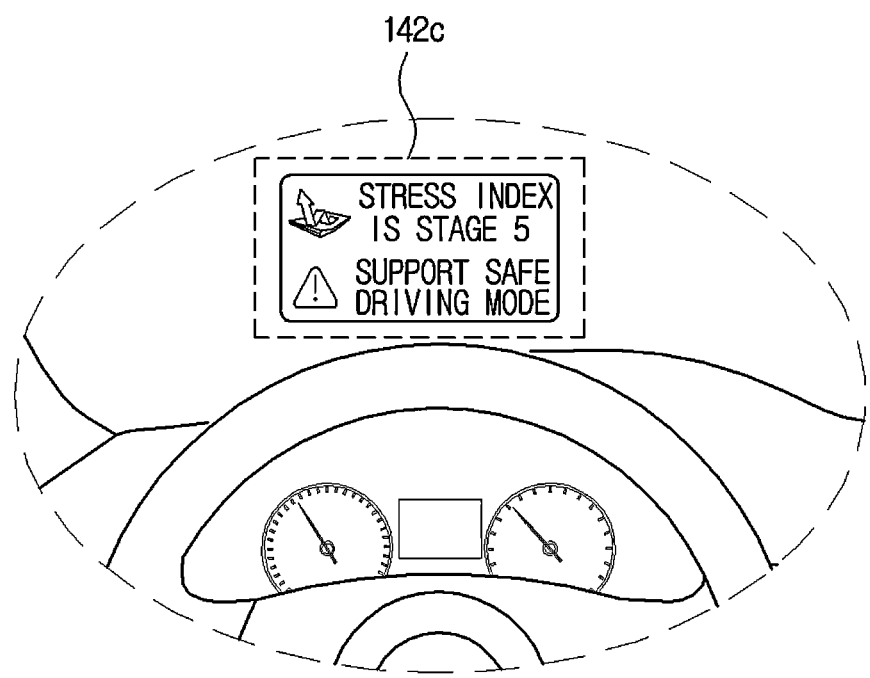

Information regarding the calculated stress index of the driver may be visually provided to the driver such that the driver recognizes a current state in advance. Hereinafter, description will be provided with reference to FIGS. 10 to 13. FIG. 10 is an exemplary diagram illustrating an internal configuration of a front seat side of the vehicle. FIGS. 11 to 13 are exemplary diagrams illustrating examples of visually outputting information on the driver's stress index.

As illustrated in FIG. 10, an audio video navigation (AVN) display 142a may be disposed in a center fascia 11 located in a substantially center area of a dashboard 10. The AVN is a device configured to integrally perform audio, video, and navigation functions. The AVN display 142a may be configured to selectively display at least one of an audio screen, a video screen, and a navigation screen, and may be implemented by a liquid crystal display (LCD), a light emitting diode (LED), a plasma display panel (PDP), an organic light emitting diode (OLED), a cathode ray tube (CRT), and the like.

The sound output unit 141 configured to output a sound may be disposed within the vehicle 100. Sounds necessary for performing the audio function, the video function, and the navigation function may be output via the sound output unit 141. The steering wheel 143 may be disposed out of the dashboard 10 of a driver's seat 21 side. A speed gauge 112d that indicates a current speed of the vehicle 100 and an RPM gauge 112e that indicates RPM of the vehicle 100 may be disposed in an area adjacent the steering wheel 143 area.

Additionally, a cluster display 142b configured to display information regarding the vehicle 100 as a digital screen may be further provided.

Although not illustrated, a head up display (HUD) configured to display visual information provided to the driver on the front glass 30 may be disposed in the dashboard 10. An image output from the HUD may be displayed via a display area 42c of the front glass 30 as illustrated in FIG. 10. The display unit 142 described in FIG. 2 may include the AVN display 142a, the cluster display 142b, and the HUD (not illustrated). The information regarding the driver's stress index may be displayed on at least one of the AVN display 142a, the cluster display 142b, and the HUD.

Referring to the example of FIG. 11, when the calculated stress index corresponds to stage 5 out of stress stages, a message that indicates that a safe driving mode will be supported may be displayed on the AVN display 142a since the current stress index corresponds to the stress stage 5. In particular, as will be described below, the safe driving mode may be a mode in which, when the current stress stage of the driver is a predetermined stage or greater, a reference value applied to a lane access distance may be set to be increased, and a warning may be output to the driver earlier than usual (e.g., prior to a predetermined occurrence or event).

Alternatively, the message having the above content may be displayed on the cluster display 142b as exemplified in FIG. 12, or the message having the above content may be displayed on the display area 42c of the front glass 30 using the HUD as exemplified in FIG. 13. The stress index calculating unit 131 may be configured to transmit the calculated stress index of the driver to the warning controller 132. The warning controller 132 may be configured to execute a warning output to the driver based on the driver's stress index and the lane access degree of the vehicle 100.

Figure 14:
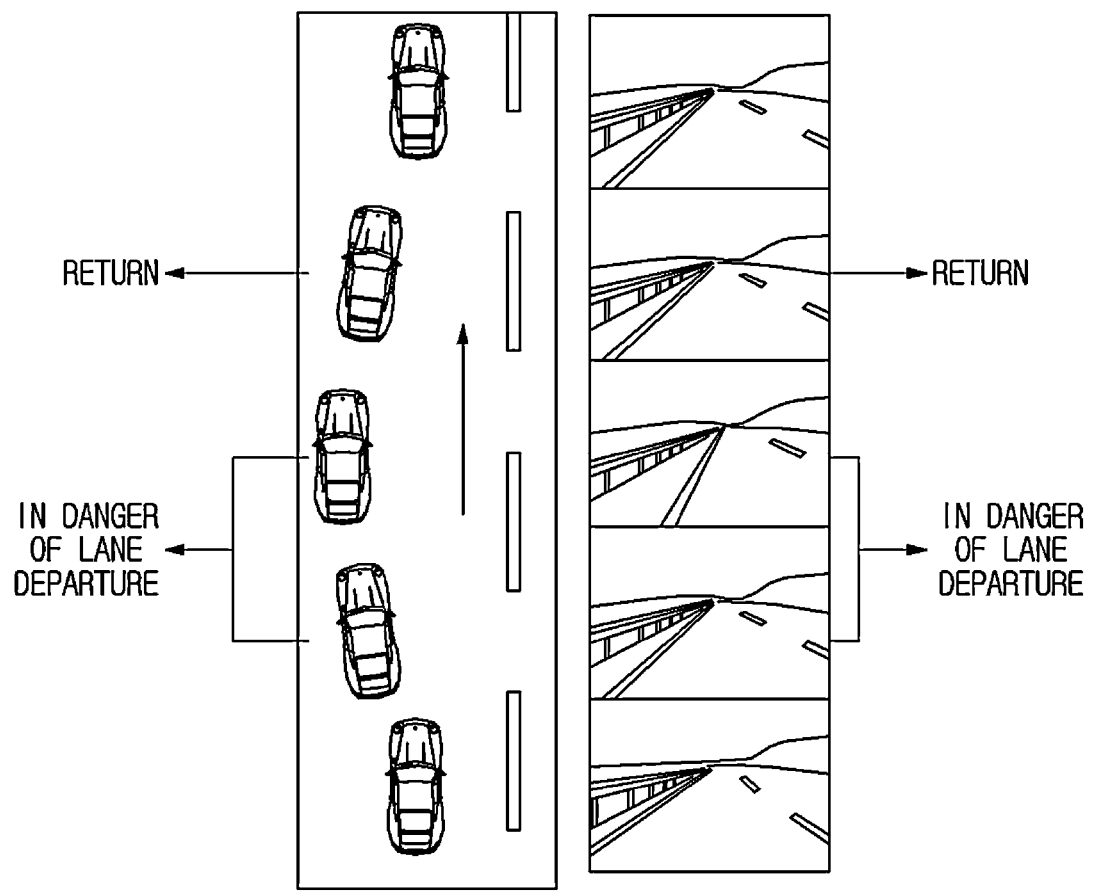
FIG. 14 is an exemplary diagram illustrating a lane access degree of the vehicle according to an exemplary embodiment of the present invention.

FIG. 14 is an exemplary diagram illustrating a lane access degree of the vehicle. When the lane detecting unit 120 transmits an output signal to the warning controller 132, the warning controller 132 may be configured to recognize the lane based on the output signal of the lane detecting unit 120, and determine the lane access degree of the vehicle 100. As exemplified in FIG. 14, when a steering angle of the vehicle running along a substantially straight road is shifted, the vehicle may deviate to one of both side lanes, and when such a state continues, the vehicle may be in danger of lane departure. Therefore, when the vehicle 100 approaches the lane more than a predetermined reference value, the warning controller 132 may be configured to determine this state as a danger state of lane departure, output a warning to the user via the sound output unit 141, the display unit 142, or the steering wheel 143. Accordingly, the user may manipulate the steering wheel 143 and return the vehicle 100 to a normal position again (e.g., return to the original driving lane).

Although FIG. 14 exemplifies a substantially straight road, the exemplary embodiment of the present invention may also be applied to a curve road. The warning controller 132 may be configured to determine the lane access degree according to control logic of a lane keeping assist system (LKAS) or a lane departure warning system (LDWS). In particular, the warning controller 132 may be configured to recognize the lane within which the vehicle 100 is running based on the output signal of the lane detecting unit 120 and calculate a distance between the lane and the vehicle 100. A reference used to calculate the distance between the lane and the vehicle 100 may be the front wheel 51 or a center of the vehicle 100.

In addition, in response to determining that the vehicle 100 approaches the lane more than the predetermined reference value, the warning may be output to the user. The predetermined reference value may be changed according to a method of representing the lane access degree. For example, since the lane access degree may be represented by the distance between the vehicle 100 and the lane, it may be represented by the distance itself or a percentage of a distance between a lane and the vehicle 100 at a current position with respect to a distance between a lane and the vehicle 100 at a normal position (e.g., the vehicle is not departing from the lane). In the latter case, 100% indicates that the vehicle 100 is running at a normal position and 0% indicates that the vehicle 100 departs from the lane.

The LKAS or the LDWS may be configured to output the warning to the user when the vehicle 100 becomes closer to the lane more than the reference value (e.g., the controller determines that the vehicle is outside of the traveling lane by a particular degree). However, since the ability to control the vehicle decreases when the driver is under stress, the warning controller 132 may be configured to apply the reference value of the lane access degree differently according to the driver's stress index. Therefore, it may be possible to complement the driver's degraded ability to control the vehicle due to the stress.

When the lane access distance of the vehicle is the predetermined reference value or less, the warning controller 132 may be configured to output the warning to the user, and the warning output may be performed in phases. For this purpose, one or more predetermined reference values may be used. Additionally, the warning controller 132 may be configured to apply different reference values according to the driver's current stress index. In other words, since the reference value that is compared with the lane access distance may differ according to the driver's stress index, the warning controller 132 may be configured to compare the reference value corresponding to the driver's current stress index with the lane access distance.

FIG. 15 is an exemplary diagram illustrating exemplary warning output control logic according to stress stages and a lane access distance. As exemplified in FIG. 15, the warning output to the user may be performed in two stages. Reference values compared with the distance (hereinafter referred to as a lane distance) between the vehicle 100 and the lane to output the warning of each stage are called a first reference value and a second reference value. As exemplified in FIG. 15, when a current stress stage of the driver is stage 1-3, that is, when the driver is in a state of a standard or better, the first reference value may be set to about 0% and the second reference value may be set to about 10%.

The warning controller 132 may be configured to compare the lane distance with the second reference value, and output a warning sound via the sound output unit 141 when the lane distance is about 10%. Types of the warning sound to be output are not limited and any warning sound may be output from the sound output unit 141, as long as it can attract the driver's attention and notify the driver that the vehicle 100 is currently in danger of lane departure. Additionally, the warning controller 132 may be configured to compare the lane distance with the first reference value. When the warning sound is output but the driver does not control steering and the lane distance becomes about 0%, the warning controller 132 may be configured to output steering handle vibration along with the warning sound. In particular, the steering handle vibration means that the steering wheel 143 vibrates.

As the stress stage increases, the driver's ability to control the vehicle may decrease. When the current stress stage of the driver is stage 4, that is, when the driver is under stress, the second reference value may be set to about (10+a) % and the first reference value may be set to about (0+b) %. Here, a and b are any positive numbers, and may be set to appropriate values according to experiments, statistics or theories. The warning controller 132 may be configured to compare the lane distance with the second reference value, and output the warning sound via the sound output unit 141 when the lane distance becomes about (10+a) %. Further, the warning controller 132 may be configured to compare the lane distance with the first reference value, and may be configured to output the steering handle vibration along with the warning sound when the lane distance becomes about (0+b) %.

When the current stress stage of the driver is stage 5, that is, when the driver is under severe stress, the second reference value may be set to about (10+A) % and the first reference value may be set to about (0+B) %. Here, A is any positive number greater than a and B is any positive number greater than b, which may be set to appropriate values according to experiments, statistics, or theories.

As exemplified in FIG. 15, when the driver is under stress, the warning may be output earlier than usual (e.g., before a particular event or when the stress is determined to prevent lane departure and improve safe driving). Therefore, it may be possible to complement the driver's degraded control ability. However, the warning controller 132 may not necessarily output the warning according to the example in FIG. 15. The stress stages may be further subdivided, three or more reference values corresponding to each stress stage may be set, and the warning may be output to the driver according to three or more stages. In addition, the warning may not necessarily be output in an auditory or tactile manner, and the warning may be visually output via the display unit 142.

Figure 16:
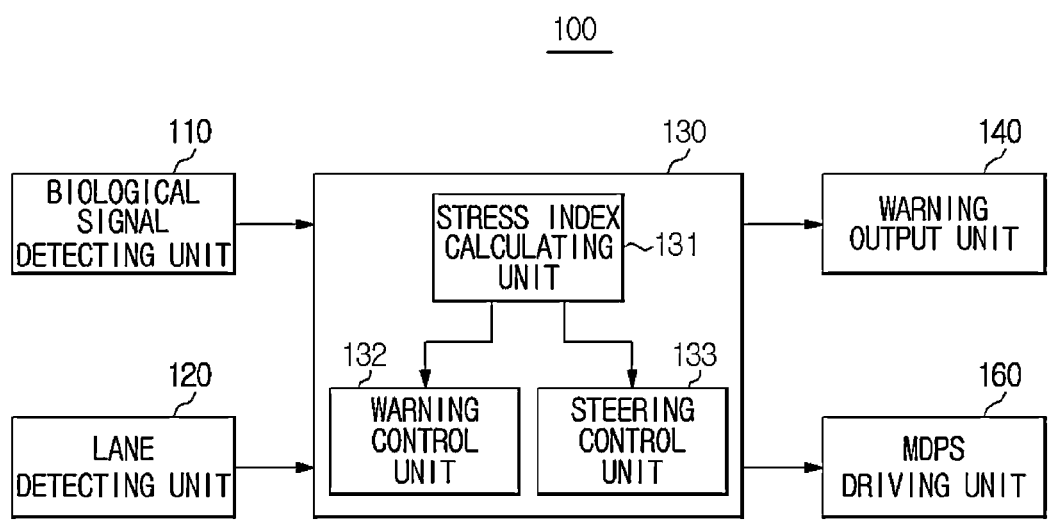
FIG. 16 is an exemplary block diagram of vehicle control by which steering is automatically controlled in the vehicle according to the exemplary embodiment of the present invention.

FIG. 16 is an exemplary block diagram of a vehicle control by which steering may be automatically controlled in the vehicle according to the exemplary embodiment of the present invention. In particular, a warning output unit 140 may include the sound output unit 141, the display unit 142, and the steering wheel 143 which may be configured to output the warning to the driver in an auditory, visual, and tactile manner.

The vehicle 100 may be configured to output the warning to the driver and automatically adjust the steering. For this purpose, the steering wheel 143 may be implemented by motor driven power steering (MDPS), and the vehicle 100 may further include an MDPS driving unit 150 configured to supply power to the steering wheel 143. The MDPS driving unit 150 may include an actuator such as a motor. The controller 130 may further include a steering controller 133. The steering controller 133 may be configured to calculate a target torque value necessary for preventing the vehicle 100 from departing from the lane, and transmit a control signal for generating the calculated target torque value to the MDPS driving unit 150.

Meanwhile, although not illustrated, the vehicle 100 may include a plurality of sensors configured to detect a current state of the vehicle 100, such as a torque sensor configured to detect torque of the steering wheel 143, a vehicle speed sensor configured to detect a speed of the vehicle 100, a yaw rate sensor, and a steering angle sensor configured to detect a steering angle of the steering wheel 143. When the target torque value for preventing lane departure is calculated, the steering controller 133 may be configured to reflect the current state of the vehicle 100 such as the torque, the vehicle speed, the yaw rate, and the steering angle detected using the sensors.

Referring again to the example in FIG. 15, when the lane distance becomes the second reference value and the warning sound is output, but the driver does not control steering and thereby the lane distance becomes the first reference value, the steering controller 133 may be configured to calculate the target torque value necessary for preventing lane departure and transmit the control signal for generating the calculated target torque value to the MDPS driving unit 150 so that steering of the vehicle 100 may be automatically controlled. At this time, the warning controller 132 may also be configured to output the warning to the driver.

Hereinafter, a method of controlling a vehicle according to an exemplary embodiment of the present invention will be described. When the method of controlling a vehicle according to the exemplary embodiment is implemented, the vehicle 100 according to the exemplary embodiment described above may be applied. Descriptions of FIGS. 1 to 16 may also be applied to the method of controlling a vehicle according to the exemplary embodiment.

Figure 17:
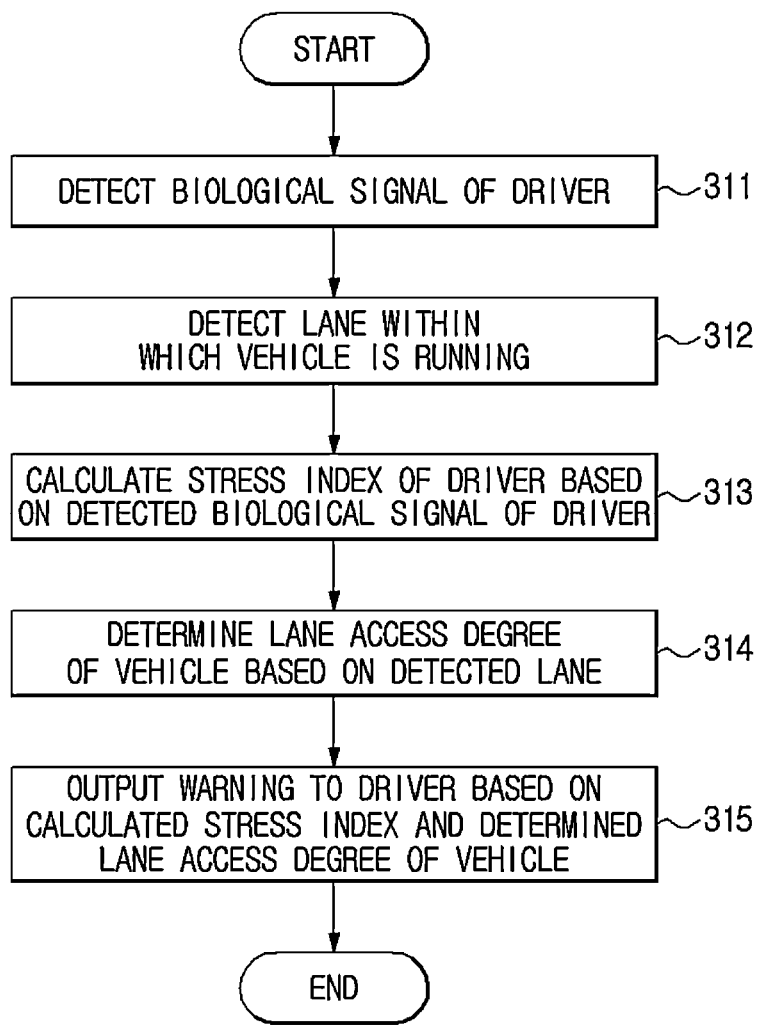
FIG. 17 is an exemplary flowchart describing a method of controlling a vehicle according to an exemplary embodiment of the present invention.

FIG. 17 is an exemplary flowchart describing a method of controlling a vehicle according to an exemplary embodiment of the present invention. As illustrated in FIG. 17, a biological signal of the driver may be detected using the biological signal detecting unit 110 (311), and a lane within which the vehicle is running may be detected using the lane detecting unit 120 (312). The detected biological signal of the driver may be used to calculate the driver's stress index and may include the ECG signal. The order of detecting the biological signal and detecting the lane is not determined. The biological signal and the lane may be simultaneously detected or either one may be detected first.

The driver's stress index may be calculated based on the detected biological signal of the driver (313). Since description of calculating the stress index is the same as those in FIGS. 5 to 9, description thereof will not be repeated. The lane access degree of the vehicle may be determined based on the detected lane (314). Since the lane access degree may be represented by the distance between the vehicle 100 and the lane. It may be represented by the distance itself, or a percentage of a distance between a lane and the vehicle 100 at a current position with respect to a distance between a lane and the vehicle 100 at a normal position.

Further, the warning may be output to the driver based on the calculated stress index and the determined lane access degree of the vehicle (315). To output the warning, any of a method of audibly outputting the warning via the sound output unit 141, a method of tactilely outputting the warning by vibrating the steering wheel 143, and a method of visually outputting the warning via the display unit 142 may be applied.

Figure 18:
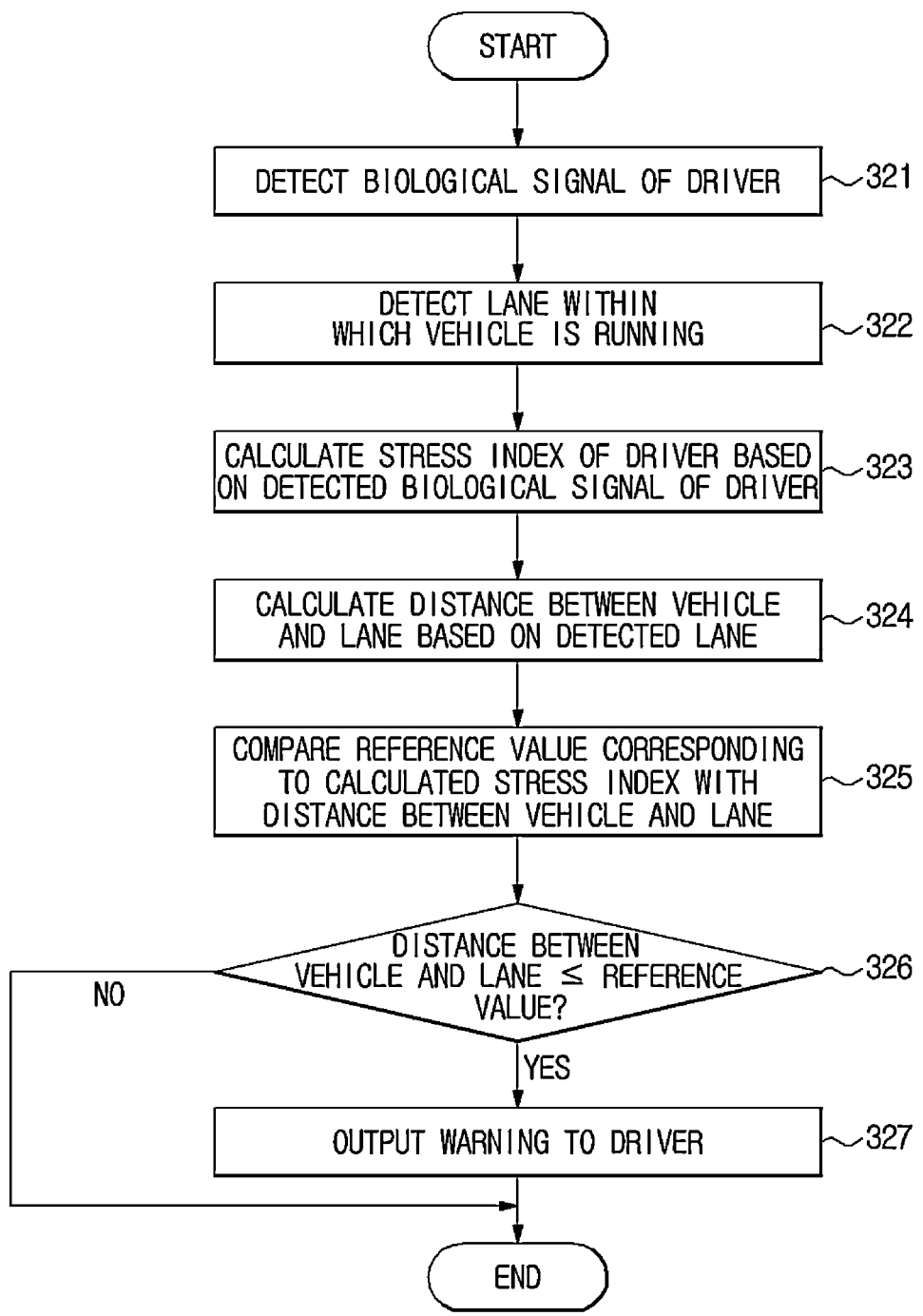
FIG. 18 is an exemplary flowchart describing a process of controlling a warning output in the method of controlling a vehicle according to the exemplary embodiment of the present invention.

FIG. 18 is an exemplary flowchart describing a process of controlling a warning output in the method of controlling a vehicle according to the exemplary embodiment of the present invention. As illustrated in FIG. 18, a biological signal of the driver may be detected (321), and a lane within which the vehicle is running may be detected (322). Then, the driver's stress index may be calculated based on the detected biological signal of the driver (323). Description of detecting the biological signal and the lane and calculating the stress index are the same as that of FIG. 17.

A distance between the vehicle and the lane may be calculated by the controller based on the detected lane (324). Specifically, based on the output signal of the lane detecting unit 120, the lane within which the vehicle 100 is running may be recognized and the distance between the lane and the vehicle 100 may be calculated. A reference used to calculate the distance between the lane and the vehicle 100 may be the front wheel 51 or a center of the vehicle 100.

The reference value that corresponds to the calculated stress index may be compared with the distance between the vehicle and the lane (325). When the calculated stress index is greater than a predetermined index, a greater reference value may be applied to warn the driver in advance. In other words, as the calculated stress index increases, the reference value that corresponds thereto also increases. Meanwhile, as described in FIG. 9, the stress index may be subdivided into a plurality of stress stages according to the value of the stress index. For each stress stage, the reference value that corresponds thereto may be set. The stress index belonging to the same stress stage may have the same reference value corresponding thereto. Then, when the distance between the vehicle and the lane is the reference value or less (Yes in 326), the warning may be output to the driver (327).

Meanwhile, the warning may be output in phases according to the distance between the vehicle and the lane, that is, the lane distance. In other words, the shorter the lane distance, the stronger the warning may be output. For this purpose, two or more reference values compared with the lane distance may be used. When there are two or more reference values, the second reference value may be compared with the lane distance first, as exemplified in FIG. 15. When the lane distance is equal to or less than the second reference value, the warning sound may be output. The lane distance may be compared with the first reference value that is less than the second reference value. When the lane distance is equal to or less than the first reference value, steering handle vibrating may be output along with the warning sound. In particular, a method of outputting the warning is not limited to the exemplary embodiment, as long as the stronger warning is output when the lane distance is equal to or less than the first reference value than when the lane distance is equal to or less than the second reference value.

Figure 19:
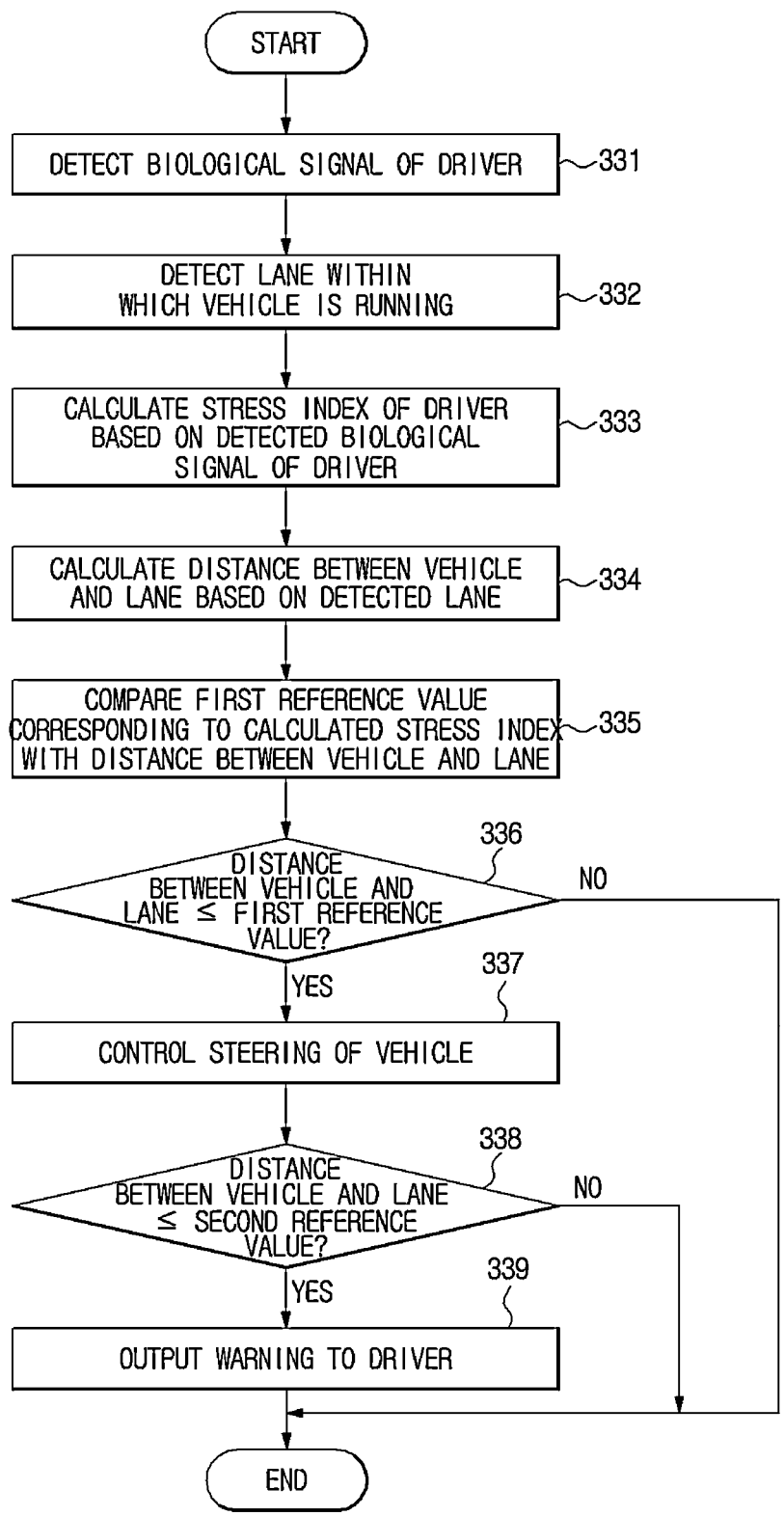
FIG. 19 is an exemplary flowchart describing a method of automatically controlling vehicle steering in the method of controlling a vehicle according to the exemplary embodiment of the present invention.

FIG. 19 is an exemplary flowchart describing a method of automatically controlling vehicle steering in the method of controlling a vehicle according to the exemplary embodiment of the present invention. As illustrated in FIG. 19, a biological signal of the driver may be detected (351), and a lane within which the vehicle is running may be detected (352).

The driver's stress index may be calculated based on the detected biological signal of the driver (353), and the distance between the vehicle and the lane may be calculated based on the detected lane (354). The second reference value that corresponds to the calculated stress index may be compared with the distance between the vehicle and the lane (355). When the distance between the vehicle and the lane is equal to or less than the second reference value (Yes in 356), the warning may be output to the driver (357). Description of the warning output is the same as that of FIG. 17. Then, the first reference value that corresponds to the calculated stress index may be compared with the distance between the vehicle and the lane (358). The first reference value may have a value less than the second reference value.

When the distance between the vehicle and the lane is equal to or less than the first reference value (Yes in 358), steering of the vehicle may be automatically controlled (359). Steering control may be performed through the MDPS. The steering controller 133 may be configured to calculate the target torque value for preventing lane departure and transmit the control signal for generating the calculated target torque value to the MDPS driving unit 150 to automatically control steering of the vehicle 100. Although the warning output and the steering control may be performed in two phases in the above description, the phases may be further subdivided, and the exemplary embodiment of the present invention is not limited thereto.

According to the exemplary embodiments of the vehicle and the method of controlling the same described above, the driver's stress index may be reflected when the warning is output or the steering may be adjusted such that the vehicle continues to run in the same lane. As a result, safe driving may be more effectively guaranteed. In the vehicle and the method of controlling the same according to the exemplary embodiments of the present invention, the lane departure warning or the lane keeping assistance may be performed by reflecting the driver's stress index so that it may be possible to more effectively guarantee safe driving.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A vehicle, comprising:
 a biological signal detecting unit configured to detect a biological signal of a driver;
 a lane detecting unit configured to detect a lane within which a vehicle is running; and
 a controller configured to:
  calculate a stress index of the driver based on the detected biological signal of the driver;
  determine a lane access degree of the vehicle including information regarding a distance between the vehicle and the lane based on the detected lane; and
  execute a warning output to the driver based on the calculated stress index and the determined lane access degree of the vehicle,
 wherein the controller is configured to:
  compare the distance between the vehicle and the lane with at least one reference value that increases as a stress stage of the driver corresponding to the stress index increases; and
  execute the warning output to the driver when the distance between the vehicle and the lane is equal to or less than the at least one reference value.

2. The vehicle according to claim 1, further comprising:
 a sound output unit configured to output a sound; and
 a steering wheel manipulated by the driver to control steering of the vehicle.

3. The vehicle according to claim 2, wherein the at least one reference value includes a first reference value and a second reference value that is greater than the first reference value; and the controller is configured to operate the sound output unit to output a warning sound when the distance between the vehicle and the lane is equal to or less than the second reference value and is greater than the first reference value.

4. The vehicle according to claim 3, wherein the controller is configured to operate the sound output unit to output a warning sound and vibrate the steering wheel when the distance between the vehicle and the lane is equal to or less than the first reference value.

5. The vehicle according to claim 1, wherein the biological signal detecting unit includes an electrocardiogram (ECG) sensor and the ECG sensor is installed within a steering wheel of the vehicle.

6. The vehicle according to claim 1, wherein the lane detecting unit includes at least one of an image sensor and an infrared sensor.

7. The vehicle according to claim 1, wherein the controller is configured to adjust steering of the vehicle based on the calculated stress index and the determined lane access degree of the vehicle.

8. The vehicle according to claim 7, wherein the controller is configured to:
 output the warning to the driver or adjust steering of the vehicle when the distance between the vehicle and the lane is equal to or less than the at least one reference value.

9. The vehicle according to claim 8, wherein the at least one reference value includes a first reference value and a second reference value that is greater than the first reference value; and the controller is configured to adjust steering of the vehicle when the distance between the vehicle and the lane is equal to or less than the first reference value, and output the warning to the driver when the distance between the vehicle and the lane is equal to or greater than the first reference value and equal to or less than the second reference value.

10. The vehicle according to claim 7, further comprising a motor driven power steering (MDPS) motor configured to supply power to a steering wheel of the vehicle, wherein the controller is configured to transmit a control signal to the MDPS motor and adjust steering of the vehicle.

11. The vehicle according to claim 1, further comprising a display unit configured to display information regarding the calculated stress index.

12. A method of controlling a vehicle, comprising:
 detecting, by a controller, a biological signal of a driver;
 detecting, by the controller, a lane within which a vehicle is running;
 calculating, by the controller, a stress index of the driver based on the detected biological signal of the driver;
 determining, by the controller, a lane access degree of the vehicle including information regarding a distance between the vehicle and the lane based on the detected lane;
 comparing, by the controller, the distance between the vehicle and the lane with at least one reference value that increases as a stress stage of the driver corresponding to the stress index increases; and
 executing, by the controller, a warning output to the driver when the distance between the vehicle and the lane is equal to or less than the at least one reference value.

13. The method according to claim 12, wherein the biological signal of the driver includes an electrocardiogram (ECG) signal, and the calculation of the stress index of the driver includes:
 obtaining, by the controller, heart rate variability based on the ECG signal of the driver; and
 calculating, by the controller, the stress index of the driver based on the obtained heart rate variability.

14. The method according to claim 12, further comprising:
 adjusting, by the controller, steering of the vehicle based on the calculated stress index and the determined lane access degree of the vehicle.

15. The method according to claim 14, wherein the execution of the warning output to the driver includes:
 comparing, by the controller, the distance between the vehicle and the lane with a second reference value that corresponds to the calculated stress index; and
 executing, by the controller, the warning is output to the driver when the distance between the vehicle and the lane is equal to or less than the second reference value.

16. The method according to claim 15, wherein the adjustment of the steering of the vehicle includes:
 comparing, by the controller, a distance between the vehicle and the lane with a first reference value that corresponds to the calculated stress index and is less than the second reference value; and adjusting, by the controller, steering of the vehicle when the distance between the vehicle and the lane is equal to or less than the first reference value.

17. A non-transitory computer readable medium containing program instructions executed by a controller, the computer readable medium comprising:
- program instructions that detect a biological signal of a driver;
- program instructions that detect a lane within which a vehicle is running;
- program instructions that calculate a stress index of the driver based on the detected biological signal of the driver;
- program instructions that determine a lane access degree of the vehicle including information regarding a distance between the vehicle and the lane based on the detected lane;
- program instructions that compare the distance between the vehicle and the lane with at least one reference value that increases as the stress stage of the driver corresponding to the stress index increases; and
- program instructions that execute a waning output to the driver when the distance between the vehicle and the lane is equal to or less than the at least one reference value.

* * * * *